United States Patent [19]

Yokoi

[11] Patent Number: 5,082,903

[45] Date of Patent: Jan. 21, 1992

[54] ACRYLIC ELASTOMER AND ITS VULCANIZABLE COMPOSITION

[75] Inventor: Kazuma Yokoi, Takahagi, Japan

[73] Assignee: Nippon Miktron Limited, Tokyo, Japan

[21] Appl. No.: 543,589

[22] Filed: Jun. 26, 1990

[30] Foreign Application Priority Data

Jun. 6, 1989 [JP] Japan .................................. 1-174945
Jun. 14, 1989 [JP] Japan .................................. 1-182289

[51] Int. Cl.$^5$ ................................................ C08F 8/30
[52] U.S. Cl. .................................... 525/340; 525/327.3; 525/352; 525/368; 525/369; 525/374; 525/375; 526/273
[58] Field of Search ............... 525/340, 352, 368, 369, 525/374, 375

[56] References Cited

U.S. PATENT DOCUMENTS

| | | | |
|---|---|---|---|
| 4,904,736 | 2/1990 | Shimizu et al. | 525/375 |
| 4,931,509 | 6/1990 | Yagashita et al. | 525/340 |
| 5,039,756 | 8/1991 | Yamamoto et al. | 525/340 |

Primary Examiner—Bernard Lipman
Attorney, Agent, or Firm—Fred Philpitt

[57] ABSTRACT

Acrylic elastomer obtained by copolymerization of an epoxy group-containing vinyl monomer and an $\alpha,\beta$-unsaturated carboxylic acid aryl ester can produce vulcanization products having good compression set and heat resistance when vulcanized together which (1) a cyanuric acid and (2) a quaternary ammonium salt or phosphonium salt as cross-linking agents without secondary vulcanization.

7 Claims, No Drawings

ACRYLIC ELASTOMER AND ITS VULCANIZABLE COMPOSITION

BACKGROUND OF THE INVENTION

1. Field of the Invention

This invention relates to an acrylic elastomer and its vulcanizable composition, and more particularly to an epoxy group-containing acrylic elastomer capable of producing a vulcanization product having a considerably high compression set and heat resistance even if the secondary vulcanization is omitted, and its vulcanizable composition.

2. Description of the Prior Art

Vulcanizable systems of acrylic elastomers having epoxy groups as cross-linking sites generally contain polyamines, polyamine salts, dithiocarbamates, organic carboxylic acid ammonium salts, imidazoles, etc. as cross-linking agents. However, these vulcanizable systems require a prolonged secondary vulcanization time, because of lower vulcanization rates, as compared with vulcanizable systems of acrylic elastomers containing halogens or active halogens as cross-linking sites, for example, vulcanizable systems containing sulfur or sulfur donor compound-alkali metal salt of fatty acid, trithiocyanuric acid-alkali metal salt of fatty acid, dithiocarbamates, etc. as cross-linking agents, and furthermore they have such disadvantages that the secondary vulcanization products have poor compression set and heat resistance.

However, the acrylic elastomers having epoxy groups as cross-linking sites have such an advantages as a lower metallic corrosion and thus improvements of the vulcanization rate and the compression set have been investigated for the effective utilization of acrylic elastomers having epoxy groups as cross-linking sites.

That is, the following cross-linking agents have been proposed for the vulcanizable system:

Japanese Patent Application Kokai (Laid-open) No. 61-26620 proposes compounds containing at least two carboxyl groups in the molecule-quaternary ammonium salt or phosphonium salt;

Japanese Patent Application Kokai (Laid-open) No. 61-235424 proposes polycarboxylic acid anhydrides-quaternary ammonium salt or phosphonium salt;

Japanese Patent Application Kokai (Laid-open) No. 62-236849 proposes polycarboxylic acids (anhydrides) -quaternary ammonium salt or phosphonium salt-urea;

Japanese Patent Applications Kokai (Laid-open) Nos. 63-57628 and 63-57629 propose organic compounds having at least two —CXNHCY— bonds (wherein X and Y: O or S) in the molecule-quaternary ammonium salt or phosphonium salt (-compound having a urea bond or thiourea bond); and Japanese Patent Application No. 63-218752 proposes organic compounds having at least two —CXNHCY— bonds (wherein X and Y: O or S) in the molecule-guanidine-based compounds.

As to acrylic elastomers having epoxy groups as the cross-linking sites in combination with other cross-linking sites or their vulcanizable systems, the following acrylic elastomers have been proposed:

Japanese Patent Application Kokai (Laid-open) No. 61-26621 proposes acrylic elastomers having epoxy groups and carboxyl groups in combination with the vulcanizable system based on quaternary ammonium salt or phosphonium salt-urea or amide; and Japanese Patent Application Kokai (Laid-open) No. 61-73708 proposes acrylic elastomers comprising copolymers of acrylic acid ester-dienic monomer-epoxy group-containing vinyl monomer (-monovinylic or monovinylidenic monomer).

However, these acrylic elastomers or their vulcanizable systems also require a secondary vulcanization in order to obtain vulcanization products having a high compression set. Furthermore, changes in the physical properties in the normal state before and after the secondary vulcanization are large and no higher heat resistance is obtained.

SUMMARY OF THE INVENTION

An object of the invention is to overcome the disadvantages of vulcanization products of these well known epoxy group-containing acrylic elastomers and to provide an acrylic elastomer capable of producing a vulcanization product having distinguished compression set and heat resistance even if the secondary vulcanization is omitted.

Another object of the present invention is to provide a vulcanizable composition containing such an epoxy group-containing acrylic elastomer.

DETAILED DESCRIPTION OF THE INVENTION

The present invention provides an acrylic elastomer comprises a copolymer of at least one of (a) alkyl acrylate having an alkyl group of 1 to 8 carbon atoms and (b) alkoxyalkyl acrylate having an alkoxyalkyl group of 2 to 8 carbon atoms, (c) an epoxy group-containing vinyl monomer and (d) aryl ester of $\alpha,\beta$-unsaturated carboxylic acid.

Alkyl acrylates as component (a) for forming the acrylic elastomer include such alkyl acrylates having an alkyl group of 1 to 8 carbon atoms (including alkyl groups containing a substituent group such as a cyano group, etc.) as methyl acrylate, ethyl acrylate, n- or iso-propyl acrylate, n- or iso-butyl acrylate, n-amyl acrylate, n-hexyl acrylate, 2-ethylhexyl acrylate, n-octyl acrylate, 2-cyanoethyl acrylate, etc., and it is preferable to use ethyl acrylate or n-butyl acrylate.

Alkoxyalkyl acrylates as component (b) include such alkoxyalkyl acrylates having an alkoxyalkyl group of 2 to 8 carbon atoms as methoxymethyl acrylate, ethoxymethyl acrylate, 2-methoxyethyl acrylate, 2-ethoxyethyl acrylate, 2-butoxyethyl acrylate, etc., and it is preferable to use 2-methoxyethyl acrylate or 2-ethoxyethyl acrylate.

Both components (a) and (b) are used together usually in a ratio of component (a) to component (b) of about 10-about 90% to about 90-about 10% by mole.

A portion, that is, up to about 20% by weight, of at least one of components (a) and (b) can be substituted with other copolymerizable monomer. Such copolymerizable monomer includes, for example, ethylene, propylene, vinyl chloride, vinylidene chloride, acrylonitrile, styrene, vinyl acetate, ethyl vinyl ether, butyl vinyl ether, alkyl methacrylate, hydroxyalkyl acrylate, alkoxyalkyl methacrylate, cyclohexyl acrylate, benzyl acrylate, furfuryl acrylate, etc.

Furthermore, a portion, that is, up to about 10% by weight, of at least one of components (a) and (b) can be substituted and copolymerized with a dienic monomer. Such dienic monomer includes, for example, divinylbenzene, piperylene, isoprene, pentadiene, vinyl cyclohexene, chloroprene, butadiene, methyl butadiene, cyclopentadiene, methyl pentadiene, ethyleneglycol diacrylate, propyleneglycol diacrylate, ethyleneglycol dimethacrylate, propyleneglycol dimethacrylate, etc.

Epoxy group-containing vinyl monomer as component (c) includes, for example, vinyl glycidyl ether, allyl glycidyl ether, glycidyl acrylate, glycidyl methacrylate, etc.

Aryl ester of $\alpha,\beta$-unsaturated carboxylic acid as component (d) includes phenyl esters, chlorophenyl esters, bromophenyl esters, nitrophenyl esters, alkylphenyl esters, alkoxyphenyl esters, etc. of such $\alpha,\beta$-unsaturated carboxylic acids as acrylic acid, methacrylic acid, crotonic acid, maleic acid, fumaric acid, etc., for example, phenyl acrylate, phenyl methacrylate, p-chlorophenyl acrylate, p-chlorophenyl methacrylate, p-bromophenyl acrylate, p-bromophenyl methacrylate, p-nitrophenyl acrylate, p-nitrophenyl methacrylate, phenyl crotonate, diphenyl maleate, diphenyl fumarate, etc.

The foregoing components are used in the copolymerization reaction in the following proportions: about 80 to 99.8% by weight preferably about 90 to 99% by weight, of at least one of component (a) and component (b), about 0.1 to about 10% by weight, preferably about 0.5 to about 5% by weight of component (c), and about 0.1 to about 10% by weight, preferably about 0.2 to about 5% by weight, of component (d).

The copolymerization reaction is carried out in the presence of an ordinary radical polymerization initiator by any one of polymerization processes such as emulsion polymerization, suspension polymerization, solution polymerization, bulk polymerization, etc., preferably by emulsion polymerization. The polymerization initiator can be used also as a redox system.

The reaction is carried out at a temperature of about $-10°$ to about 100° C., preferably about 2 to about 80° C. in a batch-wise, continuous or intermittent fead system. After the completion of reaction, the formed polymers are recovered by separation, dependent upon the type of employed polymerization method, for example, by adding a coagulating agent such as acid or polyvalent metal salts, etc. to the reaction mixture in case of emulsion polymerization method or suspension polymerization method, and the recovered polymers are then washed and dried, and then subjected to cross-linking with a cross-linking agent.

The thus obtained, epoxy group-containing acrylic elastomer can be vulcanized with (1) a cyanuric acid and (2) at least one of a quaternary ammonium salt and phosphonium salt as cross-linking agents.

The following compounds are used as these two kinds of cross-linking agents.

(1) The cyanuric acid for use in the present invention includes cyanuric acid, isocyanuric acid, and their monoalkyl and monoaryl-substituted compounds such as monomethyl, monoethyl and monophenyl-substituted compounds, etc.

(2) The quaternary ammonium salt and phosphonium salt for use in the present invention include compounds represented by the following formulae, respectively:

wherein
$R_1$ to $R_4$: alkyl groups having 1 to 25 carbon atoms, alkoxy groups, aryl groups, alkylaryl groups, aralkyl groups and polyoxyalkylene groups, and two or three of these groups can be combined with N or P to form a heterocyclic structure $X^-$: anions such as $Cl^-$, $Br^-$, $I^-$, $HSO_4^-$, $H_2PO_4^-$, $RCOO^-$, $ROSO_2^-$, $RSO^-$, $ROPO_2H^-$, $CO^{--}$, etc.

The quaternary ammonium salts and phosphonium salts include, for example, such quaternary ammonium salts as tetraethylammonium bromide, tetrabutylammonium chloride, tetrabutylammonium bromide, tetrabutylammonium iodide, n-dodecyltrimethylammonium bromide, cetyldimethylbenzylammonium chloride, methylcetyldibenzylammonium bromide, cetyldimethylethylammonium bromide, octadecyltrimethylammonium bromide, cetylpyridium chloride, cetylpyridium bromide, cetylpyridium iodide, cetylpyridium sulfate, tetraethylammonium acetate, trimethylbenzylammonium benzoate, trimethylbenzylammonium-p-toluene sulfonate, trimethylbenzylammonium borate, 8-benzyl-1,8-diazabicyclo[5,4,0]undec-7-enium chloride, 1,8-diazabicyclo[5,4,0]undecene-7-methylammonium methosulfate, 5-benzyl-1,5-diazabicyclo[4,3,0]-5-nonenium chloride, 5-benzyl-1,5-diazabicyclo[4,3,0]-5-nonenium bromide, 5-benzyl-1,5-diazabicyclo[4,3,0]-5-nonenium tetrafluoroborate, 5-benzyl-1,5-diazabicyclo[4,3,0]-5-nonenium hexafluorophosphate, etc., and such quaternary phosphonium salts as tetraphenylphosphonium chloride, triphenylbenzylphosphonium chloride, triphenylbenzylphosphonium bromide, triphenylmethoxymethylphosphonium chloride, triphenylmethylcarbonylmethylphosphonium chloride, triphenylethoxycarbonylmethylphosphonium chloride, trioctylbenzylphosphonium chloride, trioctylmethylphosphonium bromide, trioctylethylphosphonium acetate, trioctylethylphosphonium dimethylphosphate, tetraoctylphosphonium chloride, cetyldimethylbenzylphosphonium chloride, etc.

It is preferable to use (3) urea or (4) guanidine together with these cross-linking agents.

The urea for use in the present invention includes urea, thiourea, their substituted compounds such as N-methyl, N-ethyl, N,N-dimethyl, N,N'-diethyl, N,N-diethyl, N,N'-ethylidene, N-acetyl, N-methyl-N'-acetyl, N,N'-dimethylol, tetramethyl, carbamyl, N-phenyl, N-benzyl, N-ethyl-N'-phenyl, N,N'-diphenyl, N,N-diphenyl, N-benzoyl, tetraphenyl and N,N-dimethyl-N,N'-dichlorophenyl-substituted ureas, carbamoylcarbamidic acid, ethyleneurea, glycolylurea, dimethylparabanic acid, benzoimidazolone, 5-methyluracil, etc.

The guanidine for use in the present invention includes guanidine and its substituted compounds such as amino, 1,1,3,3-tetramethyl, n-dodecyl, methylol, dimethylol, 1-phenyl, 1,3-diphenyl, 1,3-di-o-tolyl, triphenyl, 1-benzyl-2,3-dimethyl and cyano-substituted guanidines, 1,6-guanidinohexane, guanylurea, biguanide, 1-o-tolylbiguanide, etc.

These cross-linking agents are used in the following proportions per 100 parts by weight of acrylic elastomer: about 0.05 to about 10 parts by weight, preferably about 0.2 to about 5 parts by weight of cyanuric acid; about 0.1 to about 10 parts by weight, preferably about 0.1 to about 5 parts by weight of quaternary ammonium salt or phosphonium salt; and about 10 to about 0 parts by weight, preferably about 5 to about 0.2 parts by weight of each of urea and guanidine.

These proportions are selected as preferable ranges in view of the vulcanization speed, storage stability, processing safety, properties and characteristics of the vulcanization products such as mechanical properties, heat resistance, compression set, etc. When each of these vulcanization system components is used below the lower limits of these selected proportions, the vulcanization speed is considerably lowered and the vulcanization products have no satisfactory physical properties. On the other hand, when these vulcanization system components are used above the upper limit of the selected proportions, such properties as storage stability, processing safety and physical properties of vulcanization products are deteriorated, though the vulcanization speed is increased in general.

A vulcanizable composition can be prepared by mixing these vulcanization system components together with other additives such as a reinforcing agent, a filler, an antioxidant, a stabilizer, a plasticizer, a lubricant, etc. by an ordinary mixing procedure such as roll mixing, Bambary mixing, solution mixing, etc. The vulcanization temperature of the thus prepared vulcanizable composition is usually 150° C. or higher, and vulcanization is carried out at that temperature by press vulcanization, secondary vulcanization or steam vulcanization.

The epoxy group and carboxylic acid aryl ester group containing acrylic elastomer of the present invention affords its press vulcanization products and its secondary vulcanization products having a very high compression set. Changes in the normal state physical properties are small before and after the secondary vulcanization. Good antiaging characteristics (heat resistance) of press vulcanization products are obtained and the secondary vulcanization can be omitted.

The present invention will be explained in detail below, referring to examples.

EXAMPLES 1 TO 3 AND COMPARATIVE EXAMPLES 1 TO 3

One hundred and fifty parts by weight of water, 0.1 part by weight of sodium sulfate, 5.5 parts by weight of a mixture of Emerl 10, Emulgen 147 and Revenol WZ (products made by Kao K.K., Japan) in a ratio of 1.5:2:2 as an emulsifier and 100 parts by weight of monomer mixture shown in Table 1 were charged into a separable flask provided with a thermometer, a stirrer, a nitrogen gas inlet and an evacuating means, and oxygen was thoroughly removed from the flask by repetitions of evacuation and nitrogen replacement. Then, a mixture of the following polymerization initiators

| | |
|---|---|
| Sodium hydrosulfite | 0.01 part by weight |
| Sodium formaldehyde sulfoxylate | 0.002 parts by weight |
| Tertiarybutyl hydroperoxide | 0.005 parts by weight | was added thereto and the polymerization mixture was subjected to polymerization reaction at room temperature for 6 hours so as to the polymerization conversion can be within a range of 95 to 99%. Then, the polymerization reaction mixture was salted out, thoroughly washed with water and dried, whereby a copolymer elastomers was obtained.

TABLE 1

| Monomer | Example | | | Comp. Ex. | | |
|---|---|---|---|---|---|---|
| (parts by weight) | 1 | 2 | 3 | 1 | 2 | 3 |
| Ethyl acrylate | 95.0 | 35.0 | 35.0 | 97.0 | 37.0 | 37.0 |
| n-Butyl acrylate | | 30.0 | 30.0 | | 30.0 | 30.0 |
| 2-Methoxyethyl acrylate | | 30.0 | 30.0 | | 30.0 | 30.0 |
| Allyl glycidyl ether | | | 3.0 | | | 3.0 |
| Glycidyl methacrylate | 3.0 | | 3.0 | 3.0 | | 3.0 |
| Phenyl methacrylate | 2.0 | 2.0 | | | | |
| p-Chlorophenyl methacrylate | | | 2.0 | | | |

Vulcanizable compositions were prepared from the acrylic elastomers obtained in Examples 1 to 3 and Comparative Examples 1 to 3 by open rolls with cooling according to the mixing formula shown in Table 2, and subjected to press vulcanization at 180° C. for 12 minutes and secondary vulcanization in a gear oven at 150° C. for 15 hours. The thus obtained vulcanization products were subjected to determination of vulcanization physical properties according to JIS K-6301. The results are shown also in Table 2. The compression set was determined at 25% compression at 150° C. for 70 hours.

TABLE 2

| | Acrylic elastomer used | | Ex. 1 | Ex. 2 | Ex. 2 | Ex. 3 | Ex. 3 | Comp. Ex. 1 | Comp. Ex. 2 | Comp. Ex. 3 |
|---|---|---|---|---|---|---|---|---|---|---|
| Formula | Acrylic elastomer | | 100 | 100 | 100 | 100 | 100 | 100 | 100 | 100 |
| (parts by weight) | Stearic acid | | 1 | 1 | 1 | 1 | 1 | 1 | 1 | 1 |
| | FEF carbon black | | 55 | 65 | 65 | 65 | 65 | 50 | 60 | 60 |
| | Antioxidant (Naugard 445, made by Uniroyal) | | 2 | 2 | 2 | 2 | 2 | 2 | 2 | 2 |
| | Zinc dimethyldithiocarbamate | | | | | | | | 2 | 2 |
| | Cyanuric acid | | 0.5 | 0.5 | 0.5 | 0.5 | 0.5 | | | |
| | Trimethyloctylammonium bromide | | 2 | 2 | | 2 | | | | |
| | Triphenylbenzylphosphonium chloride | | | | 2 | | 2 | | | |
| | Diphenylurea | | 1 | 1 | | 1 | | | | |
| | Diphenylguanidine | | | | 1 | | 1 | | | |
| Normal state physical | Hardness | (JIS-A) | 58 | 59 | 59 | 61 | 61 | 55 | 57 | 55 |
| properties of press | Tensile strength | (kgf/cm²) | 129 | 108 | 106 | 116 | 118 | 112 | 104 | 102 |
| vulcanization | Elongation | (%) | 286 | 276 | 272 | 268 | 265 | 465 | 398 | 434 |
| products | Compressions set | (%) | 20 | 30 | 36 | 18 | 25 | 64 | 62 | 68 |
| Press vulcanization products, | Hardness change | (pts) | +8 | +12 | +12 | +10 | +10 | +20 | +19 | +23 |
| after aging by heating in gear | Tensile strength change | (%) | +10 | +18 | +18 | +12 | +13 | +16 | +18 | +20 |
| oven at 175° C. for 70 hours | Elongation change | (%) | −26 | −25 | −25 | −30 | −32 | −68 | −66 | −70 |
| Normal state physical | Hardness | (JIS-A) | 62 | 66 | 66 | 65 | 65 | 67 | 70 | 68 |
| properties of secondary | Tensile strength | (kgf/cm²) | 143 | 128 | 126 | 124 | 125 | 146 | 125 | 122 |
| vulcanization | Eongation | (%) | 257 | 225 | 218 | 215 | 212 | 264 | 203 | 194 |
| products | Compression set | (%) | 16 | 23 | 28 | 15 | 18 | 52 | 48 | 54 |

What is claimed is:

1. A vulcanizable composition which comprises a copolymer of
   (a) at least one acrylate selected from the group consisting of
      (1) an alkyl acrylate having an alkyl group having 1 to 8 carbon atoms, and
      (2) an alkoxyalkyl acrylate having an alkoxyalkyl group having 2 to 8 carbon atoms, and (b) an epoxy group-containing vinyl monomer, and
(c) an α,β-unsaturated carboxylic acid aryl ester, together with both
    (i) a cyanuric acid cross-linking agent, and
    (ii) at least one cross-linking agent selected from the group consisting of
        (A) a quaternary ammonium salt, and
        (B) a phosphonium salt.

2. A vulcanizable elastomer composition according to claim 1 which contains 0.05 to 10 parts by weight of cyanuric acid and 0.1 to 10 parts by weight of quaternary salt per 100 parts by weight of the copolymer elastomer.

3. A vulcanizable elastomer composition according to claim 1 which also includes urea as a cross-linking agent.

4. A vulcanizable elastomer composition according to claim 1 which also includes guanidine as a cross-linking agent.

5. A vulcanizable elastomer composition according to claim 1 which also includes both urea and guanidine as cross-linking agents.

6. A composition according to claim 3 which contains less than 10 parts of urea per 100 parts of copolymer.

7. A composition according to claim 4 which contains less than 10 parts of guanidine per 100 parts of copolymer.

* * * * *